May 7, 1968 R. A. DE REGNAUCOURT ET AL 3,382,006
ONE-PIECE RIM CLAMPING DEVICE AND MOUNTING MEANS THEREFOR
Filed Aug. 16, 1966 2 Sheets-Sheet 1
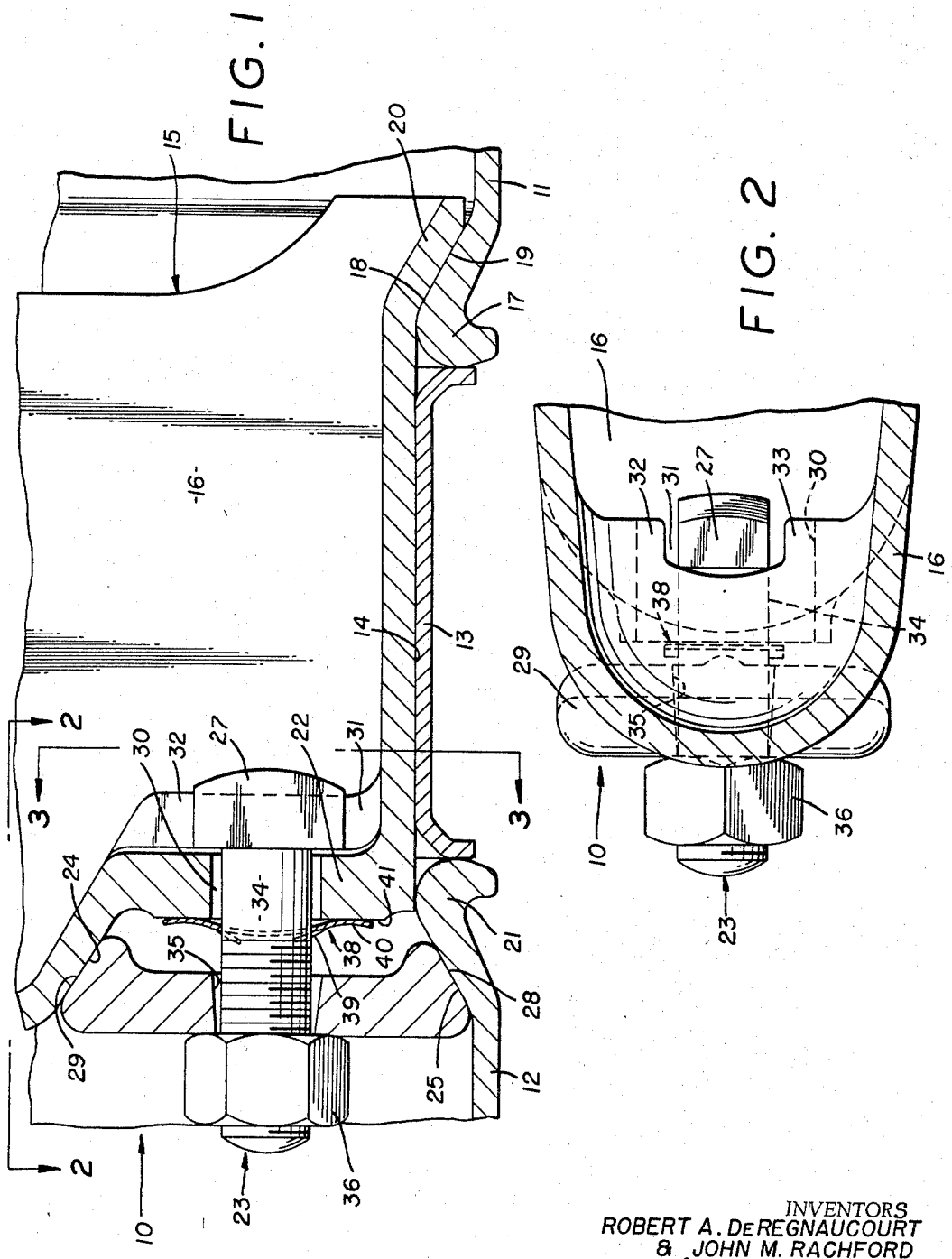
INVENTORS
ROBERT A. DE REGNAUCOURT
& JOHN M. RACHFORD
BY Hamilton & Cook
ATTORNEYS

INVENTORS
ROBERT A. DE REGNAUCOURT
& JOHN M. RACHFORD

ATTORNEYS

United States Patent Office 3,382,006
Patented May 7, 1968

3,382,006
ONE-PIECE RIM CLAMPING DEVICE AND
MOUNTING MEANS THEREFOR
Robert A. De Regnaucourt, Centerville, and John M.
Rachford, Dayton, Ohio, assignors to The Dayton
Steel Foundry Company, Dayton, Ohio, a corporation of Ohio
Filed Aug. 16, 1966, Ser. No. 572,836
1 Claim. (Cl. 301—13)

ABSTRACT OF THE DISCLOSURE

A clamping device and mounting bolt for securing one or more rims onto a wheel having a felly surface. For each of the plurality of clamping devices used the wheel has an axially conical fulcrum shoulder radially inwardly of the felly and an anchor means therebetween. An elongate aperture in the anchor means receives the enlarged head on the mounting bolt when oriented in one direction yet the enlarged head is lockingly anchored within a keyway in the anchor means when the head is oriented transversely the position in which it is received through the aperture. The shank of the mounting bolt is of such dimension that it is permitted to gyrate with respect to the wheel when the enlarged head is anchored therein. The shank of the mounting bolt is also received through an inwardly flared bore through the clamping device so as to permit independent gyration of the clamping device with respect to the shank. The radially inner side of the clamping device is concave to engage the axially conical fulcrum shoulder on the wheel, and the radially outer side of the clamping device is convex to engage an axially conical mounting surface on the rim.

---

The present invention relates generally to rim and wheel assemblies. More particularly, the present invention relates to clamping devices for rim and wheel assemblies. Specifically, the present invention relates to an improved clamping device and mounting bolt whereby rims, as used on trucks, tractors and trailers, may be demountably secured to a wheel.

The prior art has seen countless types and forms of rim clamps. One historic type clamping device utilized an annular, split, wedge ring of triangular cross section which was inserted between a tapered face at the outboard portion of the inner diameter of the rim and a corresponding face on the outer surface of the felly or spokes. The axially outer surface of this ring was engaged by a series of clamping lugs which could be tightened against the ring by nuts on appropriately located, fixed stud bolts. A disclosure of this construction may be seen, for example, in U.S. Patent No. 1,869,635.

The use of this one-piece ring was subsequently replaced by the use of individual clamping lugs, also carried on fixed stud bolts. The most successful of the individual clamping lugs had an axially extending leg on the radially outer portion thereof which slidingly engaged the wheel felly and wedgingly engaged the rim. A clamping device of this nature may be seen, for example, in U.S. Patent No. 2,874,997.

The use of individual clamping lugs did lower the cost and substantially improve the ease of demountably securing the rim, or rims, to the wheel, but it did not relieve the major maintenance problems chronic to the use of demountable rims.

Proper seating of the clamp lug remained a problem. Particularly with the one-piece clamp lugs, dimensional variations in the rim, wheel or spacer were critical. Such dimensional variations would cause the clamps to "cock" when they were tightened into operative position on the stud bolt because they would be eccentrically loaded thereby. This tilting not only created a static load variation between the individual clamping devices but also induced undesirable stress impositions under dynamic loading. With each revolution of the wheel any stud carrying a tilted clamp would be subjected to flexural and/or torsional stresses as that clamp improperly received the weight load. Broken studs and clamps resulted.

Moreover, devices employing the one-piece annular wedge ring had similar operational difficulties. Any improper seating of the ring would also cause improper load distribution, and the resulting flexure of the ring would be transmitted to all the clamps—eventually loosening the tightening means and allowing rim slippage.

Such difficulties engendered the use of a plurality of compound, or two-piece, clamps which are themselves inherently flexible. As such, they compensate for dimensional variations in the wheel components and do not subject the stud bolts on which they are carried to the aforesaid flexing stresses. An example of such a development can be found, for example, in U.S. Patent No. 3,013,842.

While such two-piece clamps do offer considerable advantages, the quest to devise an arrangement employing a plurality of one-piece clamps which offer at least the same advantages at a lower cost has continued.

It is therefore an object of the present invention to provide a rim and wheel assembly employing a plurality of one-piece clamping devices which are not subject to eccentric loading and will therefore not "cock" like prior known single piece clamping devices.

It is another object of the present invention to provide a rim and wheel assembly employing a plurality of one-piece clamps which will not subject the mounting bolts on which they are mounted to flexing stresses.

It is still another object of the present invention to provide a rim and wheel assembly employing a plurality of one-piece clamps which equalize the forces applied to their mounting nuts.

It is a further object of the present invention to provide a rim and wheel assembly in which the clamps can be secured and released with absolute ease.

It is a still further object of the present invention to provide a rim and wheel assembly in which the clamps permit the use of a wheel having decreased lateral dimension and reduced weight.

These and other objects of the present invention, as well as the advantages thereof over existing and prior art forms, will become apparent from the following specification and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In the drawings:

FIG. 1 is a fragmentary sectional view of a rim and wheel assembly employing a clamping arrangement embodying the concept of the present invention;

FIG. 2 is a sectional view taken substantially on line 2—2 of FIG. 1; and,

Figure 3:
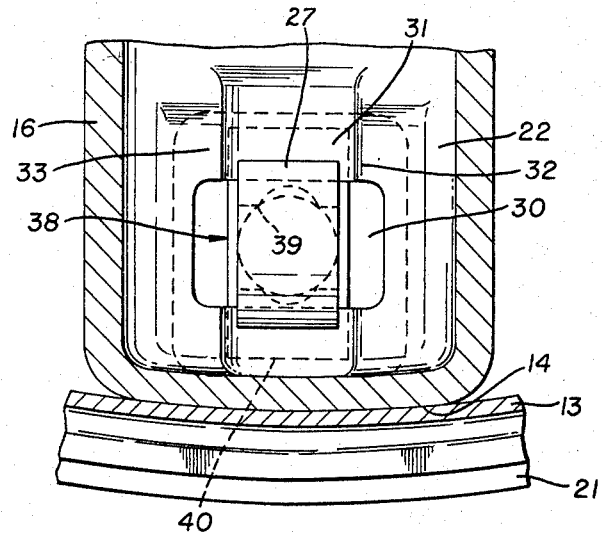
FIG. 3 is a sectional view taken substantially on line 3—3 of FIG. 1.

In general, in a rim and wheel assembly according to the concept of the present invention the wheel has a felly surface, or spoke ends corresponding thereto, on which can be mounted one or more rims. The rim is provided with an axially inclined mounting surface which extends axially outwardly beyond the felly to a position radially outwardly of an oppositely inclined fulcrum shoulder on the wheel. A clamping device is secured to the wheel by a mounting bolt, the head of which is anchored to the wheel in such a way as to provide self-alignment by limited gyration of the shank portion about the head portion. The clamp itself is generally of voussoir-shaped cross section with the radially outermost of the tapered sides wedgingly engaging the mounting surface on the rim and the radially innermost of the tapered sides engaging the fulcrum shoulder on the wheel.

Referring more particularly to the drawings, and FIG. 1 in particular, the one-piece rim clamping device, indicated generally by the numeral 10, is installed to secure an inner rim 11 and an interchangeable outer rim 12, separated by an annular spacer band 13, in operative position on the felly, or spoke ends, 14 of a wheel 15. Wheel 15 may have any desired number of spokes 16 emanating from a central hub area, not shown, each of which terminate at its radially outermost end in the felly-like surface 14.

The gutter flange 17 of the conventional inner rim 11 has a mounting surface 18 which is matingly seated on the conventionally inclined (i.e., 28°) surface 19 on shoulder 20 at the axially innermost end of the felly 14. At the axially outermost end of the felly 14, which need be of an axial dimension sufficient only to support the radially innermost periphery of the gutter flange 21 on rim 12, a boss portion 22 extends radially inwardly to provide an anchor means, more fully hereinafter described, for attaching the mounting bolt 23 to the wheel 15. Radially inwardly of the boss 22 the wheel wall angles axially outwardly to form a fulcrum shoulder 24 directly inwardly of the mounting surface 25 on the gutter flange 21 of the outer rim 12. The mounting surface 25 which is generally conical due to the annular nature of the rim 12, is preferably mirrored by a similarly conical presentation of the fulcrum shoulder 24. In that way the clamping device 10 may have the voussoir-shaped radial cross section depicted with the radially outer side 28 thereof convex to engage the axially conical mounting surface 25, and the radially inner side 29 concave to engage the axially conical shoulder 24.

The T-shaped head portion 27 and the mounting bolt 23 is insertably receivable in an elongated aperture 30 axially through the boss portion 22. On the axially innermost side of the boss a keyway 31, formed by radial ribs 32 and 33, extends transversely of the aperture lockingly to anchor the head portion 27 of the mounting bolt 23 against axial withdrawal and also against rotation as the clamping device is tightened into operable position.

The shank 34 of the mounting bolt 23 extends axially outwardly of the boss 22 and through a bore 35 in the medial portion of the clamping device 10. A nut 36 is received on the threaded shank 34 which, when tightened against the clamping device 10 forces the radially outer side, or wedge surface, 28 thereof into engagement with the mounting surface 25 on the outer rim 12 and the radially inner side, or balance surface, 29 tightly against the fulcrum shoulder 24. The bore 35 is flared inwardly, as shown, to allow the clamping device 10 self-positioning freedom as it seats against the mounting surface 25 and the fulcrum shoulder 24. The clamping device thus acts as a simple beam between the rim and the wheel with its voussoir-shaped cross section accommodating any dimensional irregularities in the components of the assembly. Such a clamp, particularly with the mounting bolt 23 also self-aligning, cannot impart deleterious bending moments to the mounting bolt. By the same token, the forces applied to the inner face of the mounting nut 36 are symmetrical, which permits it to be readily secured and released and at the same time tends to prevent it from working loose.

To further facilitate mounting of the rims on the wheels, a retaining clip 38 is recommended. The clip 38 is preferably fabricated of spring steel with an axial portion 39 adapted frictionally to engage the shank 34 of mounting bolt 23 and a peripheral portion 40 adapted to seat against the outboard face 41 on boss 22. The clip 38 thus retains the bolts 23 in a generally axially oriented position, at least until the clamping devices are positioned thereon.

It should be readily apparent that a clamping device and support of the nature above-described would work equally well with single or dual mounted rims and otherwise accomplish the object of the invention.

What is claimed is:

1. In combination, a wheel having a felly-like surface for mounting at least one rim having an axially conical mounting surface, a plurality of one-piece clamping devices and a bolt having a shank and enlarged head portion for interconnecting each said clamping device to the wheel, said wheel having an axially conical fulcrum shoulder on the axially outer side thereof and radially inwardly of said felly, an anchor means positioned between said felly and said fulcrum shoulder, said anchor means having a boss with an axial aperture therethrough that is transversely elongate and a keyway on the axially inner side of said boss transversely of said aperture, the enlarged head portion of said bolt insertably received through said aperture with the enlarged head oriented in one direction and said enlarged head lockingly anchored in said keyway with the enlarged head oriented transversely of the position in which it is received through said elongate aperture, the cross-sectional dimensions of said shank being sufficiently less than the dimension of said aperture to permit gyration of said shank with respect to said wheel when said enlarged head is anchored in said keyway, said clamping device having a voussoir-like radial cross section with a wedge surface on the radially outer side thereof being convex matingly to engage the axially conical mounting surface on said rim and with a balance surface on the radially inner side thereof being concave matingly to engage the axially conical fulcrum shoulder on said wheel, the shank of said bolt being received within an inwardly flared bore extending through the medial portion of said clamping device to permit gyration of said clamping device with respect to said shank.

References Cited

UNITED STATES PATENTS

| 1,797,195 | 3/1931 | Burdette | 301—12 |
| 1,812,338 | 6/1931 | Holt | 301—20 X |
| 1,884,936 | 10/1932 | Walther | 301—13 |
| 2,187,032 | 1/1940 | Horn | 301—18 X |
| 3,039,824 | 6/1962 | Walther | 301—20 |

FOREIGN PATENTS

| 484,241 | 5/1938 | Great Britain. |

RICHARD J. JOHNSON, *Primary Examiner.*